(12) United States Patent
De et al.

(10) Patent No.: US 8,271,990 B2
(45) Date of Patent: Sep. 18, 2012

(54) REMOVING OPERATING SYSTEM JITTER-INDUCED SLOWDOWN IN VIRTUALIZED ENVIRONMENTS

(75) Inventors: Pradipta De, Kolkata (IN); Ravi Kothari, New Delhi (IN); Vijay Mann, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 12/394,420

(22) Filed: Feb. 27, 2009

(65) Prior Publication Data

US 2010/0223616 A1 Sep. 2, 2010

(51) Int. Cl.
*G06F 9/46* (2006.01)

(52) U.S. Cl. .................................................... 718/104
(58) Field of Classification Search .................. 718/100, 718/104
See application file for complete search history.

(56) References Cited

U.S. PATENT DOCUMENTS

| 6,957,435 | B2 * | 10/2005 | Armstrong et al. | 718/104 |
| 2007/0028237 | A1 * | 2/2007 | Bulson et al. | 718/1 |
| 2007/0226449 | A1 | 9/2007 | Akimoto | |
| 2008/0028410 | A1 * | 1/2008 | Cherkasova et al. | 718/104 |
| 2008/0034366 | A1 | 2/2008 | Tanaka et al. | |

OTHER PUBLICATIONS

Gioiosa, R., Petrini, F., Davis, K., Lebaillif-Delamare, F., Analysis of system overhead on parallel computers, Dec. 2004, Proceedings of the Fourth IEEE Internation Symposium on Signal Processing and Information Technology, 2004, pp. 397-390.*

Petrini, et al., "The Case of the Missing Supercomputer Performance: Achieving Optimal Performance on the 8192 Processors of ASCI Q," in ACM Supercomputing, 2003.
Beckman, et al. "The Influence of Operating Systems on the Performance of Collective Operations at Extreme Scale," in IEEE International Conference on Cluster Computing, 2006.
Garg et al., "The Impact of Noise on the Scaling of Collectives: An Empirical Evaluation," in High Performance Computing (HiPC), 2006.
Mergen, et al., "Virtualization for High Performance Computing", in ACM SIGOPS Operating Systems Review, pp. 8-11, 2006.
Huang, et al., "A Case for High Performance Computing with Virtual Machines" in ICS, 2006.
Engelmann, et al., "Configurable Virtualized System Environments for High Performance Computing", in HPCVirt, 2007.
Könning, et al. "Virtualized environments for the Harness high performance computing workbench" 16th Euromicro International Conference on PDP, 2008.
Armstrong, et al. "Advanced Virtualization Capabilties of POWER5 Systems", IBM Journal on Research and Development, vol. 49, Jul./Sep. 2005.
IBM Corporation, "IBM Systems Virtualization Version 2 Release 1 (2005)".
Hales et al. IBM Corporation, "Advanced POWER Virtualization on IBM System p: Introduction and Configuration", 2005.
Adra et al. IBM Corporation, "IBM System p Advanced POWER Virtualization Best Practices", 2006.
Eric Van Hensbergen, "The Effect of Virtualization on OS Interference", IBM Research, 2005.

* cited by examiner

*Primary Examiner* — Jennifer To
*Assistant Examiner* — Blake Kumabe
(74) *Attorney, Agent, or Firm* — Ryan, Mason & Lewis, LLP (57) ABSTRACT

Techniques for eradicating operating system jitter-induced slowdown are provided. The techniques include allocating one or more computing resources to one or more logical partitions of one or more parallel programs in proportion of one or more cycles consumed by one or more sources of operating system jitter in each compute phase in each of the one or more logical partitions.

20 Claims, 8 Drawing Sheets

ALLOCATE ONE OR MORE COMPUTING RESOURCES TO ONE OR MORE LOGICAL PARTITIONS OF ONE OR MORE PARALLEL PROGRAMS IN PROPORTION OF ONE OR MORE CYCLES CONSUMED BY ONE OR MORE SOURCES OF OPERATING SYSTEM JITTER IN EACH COMPUTE PHASE IN EACH OF THE ONE OR MORE LOGICAL PARTITIONS ~ 802

REMOVING OPERATING SYSTEM JITTER-INDUCED SLOWDOWN IN VIRTUALIZED ENVIRONMENTS

FIELD OF THE INVENTION

Embodiments of the invention generally relate to information technology, and, more particularly, to operating system (OS) jitter.

BACKGROUND OF THE INVENTION

Large scale clusters or supercomputers are usually used for executing scientific parallel applications with a large number of threads. Typically, a thread is spawned on a physical central processing unit (CPU). The nature of the applications is such that after a block of computation, the threads synchronize through barrier calls. This forms the compute-barrier kernel of most parallel applications (referred to as "Collectives"). A thread executing on a processor can be preempted if system activities, such as operating system (OS) daemons or interrupts, need to be scheduled. This slows down the thread that is preempted, thereby causing other threads on other processors to wait at the synchronization call.

SUMMARY OF THE INVENTION

Principles and embodiments of the invention provide techniques for removing OS jitter-induced slowdown. An exemplary method (which may be computer-implemented) for eradicating operating system jitter-induced slowdown, according to one aspect of the invention, can include allocating one or more computing resources to one or more logical partitions of one or more parallel programs in proportion of one or more cycles consumed by one or more sources of operating system jitter in each compute phase in each of the one or more logical partitions.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are to be stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
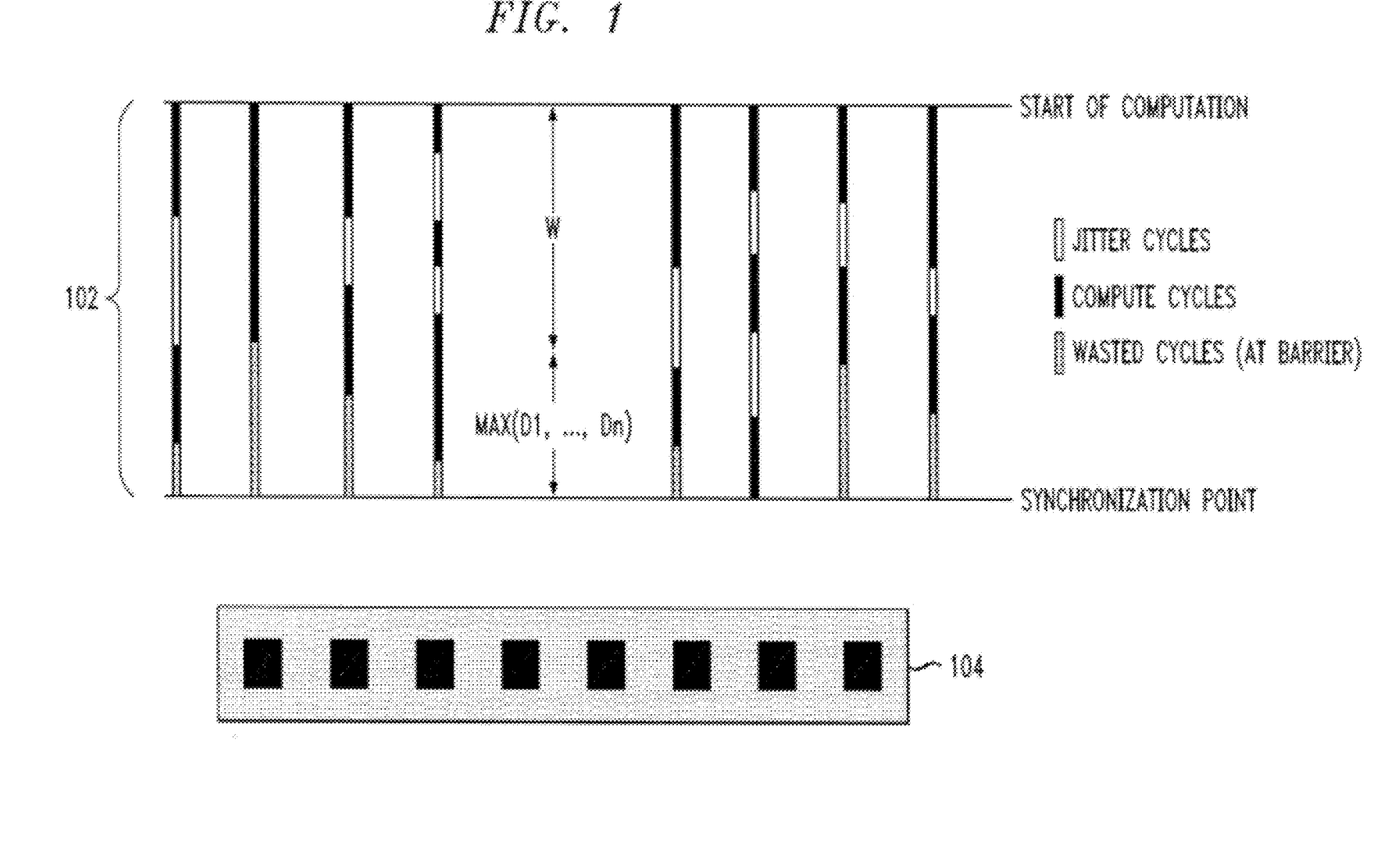
FIG. 1 is a diagram illustrating the impact of OS jitter on a parallel application with 8 threads running on an 8-way symmetric multiprocessing (SMP) box, according to an embodiment of the present invention.

Principles of the invention include handling operating system (OS) jitter for virtualized environments using dynamic central processing unit (CPU) slicing. The interference caused by the OS related activities is referred to as OS jitter, and is a source of performance degradation as threads are stalled at the barrier calls. FIG. 1 is a diagram illustrating the impact of OS jitter on a parallel application with 8 threads running on an 8-way SMP box, according to an embodiment of the present invention. By way of illustration, FIG. 1 depicts eight HPC threads 102 executing a compute phase on eight physical processors 104. During the compute phase, the threads get interrupted by various sources of OS jitter (lightly shaded bars). As a result, all threads have to wait for some cycles for the slowest thread ($3^{rd}$ thread from the right) to finish.

FIG. 1 shows only one of the phases among multiple phases of the compute-barrier sequence. The time taken by this phase is W+Max(D1, D2, ..., Dn), where W is the time to finish the computation without any jitter interruption, and Di (where i can be any one of 1 to n) is the interruption due to a jitter. As described herein, one or more embodiments take advantage of the ability of a virtual environment to dynamically allocate resources to different partitions in order to reduce the impact of OS jitter and speed up an entire application.

The techniques described herein include applicability, for example, with virtual machines dealing with processor virtualization, operating systems that execute in the virtual machine environments, parallel scientific applications from high performance computing domain that are executed in each virtual partition, etc. One or more embodiments of the invention include adaptive processor sharing in a virtualized environment for improving the throughput of parallel applications by compensating for processor cycles wasted in servicing the non-application processes, most of which are due to the operating system.

In a virtualized environment, each logical partition (LPAR) can be used to execute a thread of a parallel application. For high-performance computing (HPC) applications with a large number of threads, virtualization offers the opportunity to run these massively parallel applications on limited physical resources. As described herein, each thread can be interrupted by operating system processes or interrupts (referred to as OS jitter), thereby slowing down the parallel application. The techniques described herein include mitigating the slowdown by compensating for the CPU cycles lost in executing the OS processes.

In one or more embodiments of the invention, logical partitions (LPARs) that run the slower HPC application threads are allocated additional computing resource from a shared pool of free CPUs by the hypervisor to speed up the thread execution so that they finish their compute phase simultaneously with the uninterrupted threads. Parallel applications that have repeated loops of computation followed by synchronization (viz. a barrier) benefit from this technique. Such applications are referred to as "collectives." One or more embodiments of the invention can also minimize the wait time for faster threads at the barrier call, thereby reducing the overall runtime of the application.

Also, in one or more embodiments of the invention, computing resource is taken away from logical partitions (LPARs) that run the faster HPC application threads and is allocated to the logical partitions (LPARs) that run the slower HPC application threads in a manner such that all the HPC threads (interrupted and uninterrupted) finish their compute phase at the same time.

Additionally, one or more embodiments of the invention can include a mechanism to measure the cycles lost to service OS jitter (or the useful cycles consumed by the application) and a mechanism for reporting the measurements back to the hypervisor for provisioning of additional CPU resource to slower threads. The lost cycles can be measured by the logical partition's OS. For reporting the measured data to the hypervisor, hypercalls can be implemented and a provisioning technique can be executed inside the hypervisor layer for allocating additional compute resource either from a shared pool of free CPUs or from the logical partitions running the faster threads to the logical partitions running the slower threads.

As described herein, one or more embodiments of the invention can include the following. Each thread of a parallel application running on a virtual partition environment can be monitored for preemptions until each thread reaches a barrier call. Also, the time spent in servicing non-application threads in each compute phase can be recorded, and a hypervisor layer of the virtual machine can allocate an additional processor to compensate for time spent in non-application threads. Additionally, the time spent for allocating an additional processor can also be taken into account for allocating an additional processor.

The techniques detailed herein include alleviating OS jitter problems when large parallel applications are executed on a virtualized platform. One or more embodiments of the invention can include, for example, leaving a few virtual processors in the virtualized environment unallocated at the start. Also, as described herein, each thread of the parallel application, spawned in a virtual partition, can be monitored to record all preemptions due to system activities (that is, OS jitter). The time spent in servicing the system threads (or alternatively, the useful cycles consumed by the application) can be recorded in a cycle-accurate manner by the OS running on the logical partition.

Whenever a jitter process interrupts an application thread in a logical partition (LPAR), the cycles lost due to OS jitter are recorded in the OS when it gets de-scheduled and reported to the hypervisor. In one or more embodiments of the invention, the hypervisor, in turn, can read common shared memory in the other LPARs to collect cycles lost due to OS jitter in each of the LPARs. At the end of the previous step, the hypervisor has gathered information about how many cycles have been lost due to OS jitter in each LPAR. The hypervisor layer can use this information, for example, to proportionally allocate compute resources (that were kept unassigned in the beginning) to the respective LPARs. In one or more embodiments of the invention, these noted steps are repeated each time a jitter process interrupts an application thread in any of the logical partitions, runs for some time and then gets de-scheduled, at which time the pool of free compute resources are gathered back and reallocated.

Additionally, in one or more embodiments of the invention, no virtual processors are left unallocated at the start. Once the hypervisor has gathered information about how many cycles have been lost due to OS jitter in each LPAR, it can make use of this information to take away computing resource from logical partitions (LPARs) that run the faster HPC application threads and allocate it to the logical partitions (LPARs) that run the slower HPC application threads in a manner such that all the HPC threads (interrupted and uninterrupted) finish their compute phase at the same time.

Figure 2:
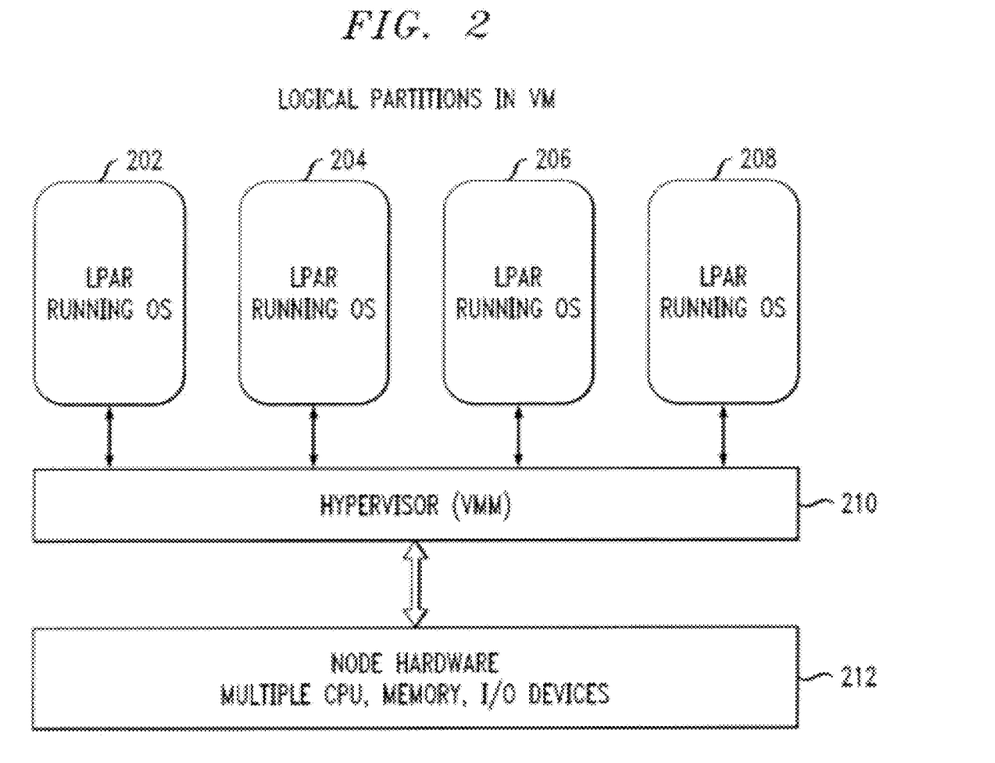
FIG. 2 is a diagram illustrating a typical virtual machine architecture showing multiple logical partitions with different resource allocations, according to an embodiment of the present invention.

FIG. 2 is a diagram illustrating a typical virtual machine architecture showing multiple logical partitions with different resource allocations, according to an embodiment of the present invention. By way of illustration, FIG. 2 depicts LPARs running OS 202, 204, 206 and 208. FIG. 2 also depicts a hypervisor (or virtual machine monitor (VMM)) 210 and node hardware (including for example, multiple CPUs, memory, I/O devices, etc.) 212.

FIG. 2 depicts typical virtual machine (VM) architecture with multiple partitions. The hypervisor or virtual machine monitor (VMM) provides a low-level abstraction layer to allow a large variety of operating systems to run on top of a shared pool of hardware resources. An instance of the OS can execute inside a VM partition, referred to as a logical partition (LPAR). The entire software suite that is required on a HPC system can be installed in an LPAR. Also, it is possible to allocate resources in different proportion to each LPAR, and it can also be altered dynamically.

By way of example, consider a scenario where a parallel scientific application that has a large number of threads must be executed on a system with fewer numbers of processors than the number of parallel threads. The use of virtualization allows combining the total pool of processor resource and partitioning them into larger number of virtual processors. Each partition can get a share of the virtual processors to execute a thread in the replicated HPC environment. In this setting, because an instance of the operating system runs on each partition, the problem of OS jitter still persists. The parallel application suffers slowdown in performance due to cycles wasted at barrier calls, waiting for the slowest thread to complete.

Figure 3:
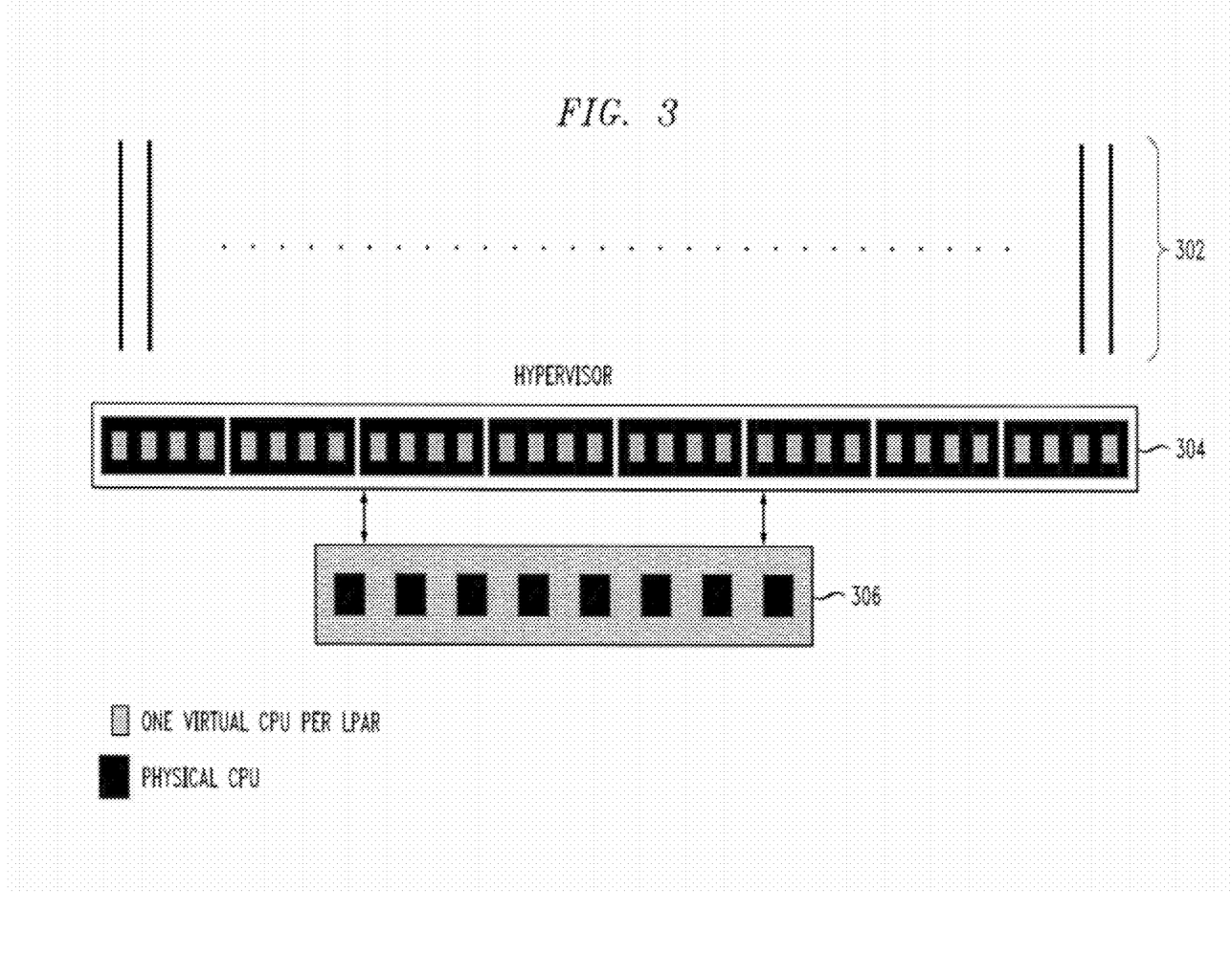
FIG. 3 is a diagram illustrating techniques for spawning multiple threads of a parallel application on a SMP box which has a physical processor count less than the threads to be spawned, according to an embodiment of the present invention.

FIG. 3 is a diagram illustrating techniques for spawning multiple threads of a parallel application on a symmetric multiprocessing (SMP) box which has a physical processor count less than the threads to be spawned, according to an embodiment of the present invention. By way of illustration, FIG. 3 depicts an eight physical CPU 306 machine being used to create thirty-two logical partitions (LPARs) 304 with one virtual CPU each so as to allow 32 HPC threads 302 to run on one machine (one HPC thread per virtual CPU in each one of the thirty-two LPARs).

FIG. 3 illustrates how to enable multiple threads of a parallel application on a SMP box with a number of physical processors that is fewer than the number of threads.

Additionally, the techniques described herein include changing the way that partitions are created. For example, in one or more embodiments of the invention, a set of virtual processors are left unassigned to any partition during the partition creation, and all partitions get an equal share of the remaining processor set.

Figure 4:
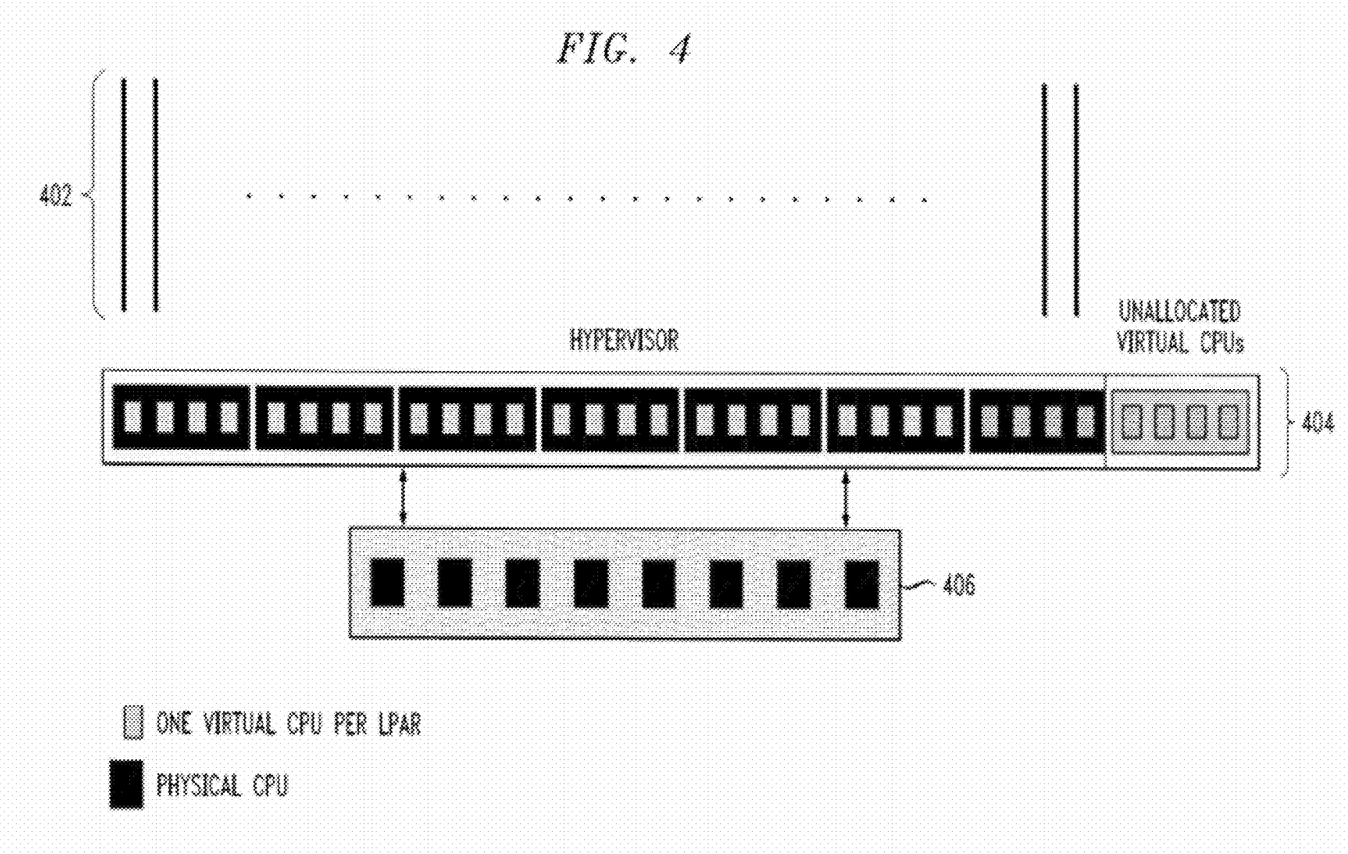
FIG. 4 is a diagram illustrating techniques for partitioning a processor pool, according to an embodiment of the present invention.

FIG. 4 is a diagram illustrating techniques for partitioning a processor pool, according to an embodiment of the present invention. By way of illustration, FIG. 4 depicts an eight physical CPU 406 machine being used to create twenty-eight logical partitions (LPARs) with one virtual CPU each and a shared pool of four free virtual CPUs 404 so as to allow 28 HPC threads 402 to run on one machine (one HPC thread per virtual CPU in each one of the twenty-eight LPARs).

As illustrated in FIG. 4, one or more embodiments of the invention include partitioning a shared pool of processors in such a way as to leave a small set of processors unallocated (that is, not assigned to any of the LPARs) in the beginning. This set of processors can be allocated dynamically (for example, to a LPAR where a thread has been slowed due to OS jitter) to handle the processor cycles lost due to OS jitter.

As described herein, one or more embodiments of the invention include accounting for interrupted cycles. For each partition, the operating system maintains a record of the number of processor cycles consumed by the HPC application thread and the cycles spent in servicing other system activities at each context switch.

Additionally, the techniques described herein can also include hypercalls for exchanging cycles lost due to OS jitter in each logical partition (LPAR) with the hypervisor. In one or more embodiments of the invention, a hypercall can be implemented that communicates a status from a LPAR to the hypervisor indicating that some cycles, say X, have been lost due to OS jitter. This is done each time a jitter process interrupts an application thread, runs for some time and then gets de-scheduled. An additional policy can be implemented in the OS such that the hypervisor is notified only if the cycles lost due to OS jitter exceed a particular threshold value, say Y. As such, the number of hypercalls increases with a smaller Y value.

On receiving a notification from an LPAR, the hypervisor can read some common shared memory in each LPAR to find out the cycles lost due to OS jitter in each of them. Once the response is collected from all the LPARs, the hypervisor has a view on the slowdown of each thread.

Figure 5:
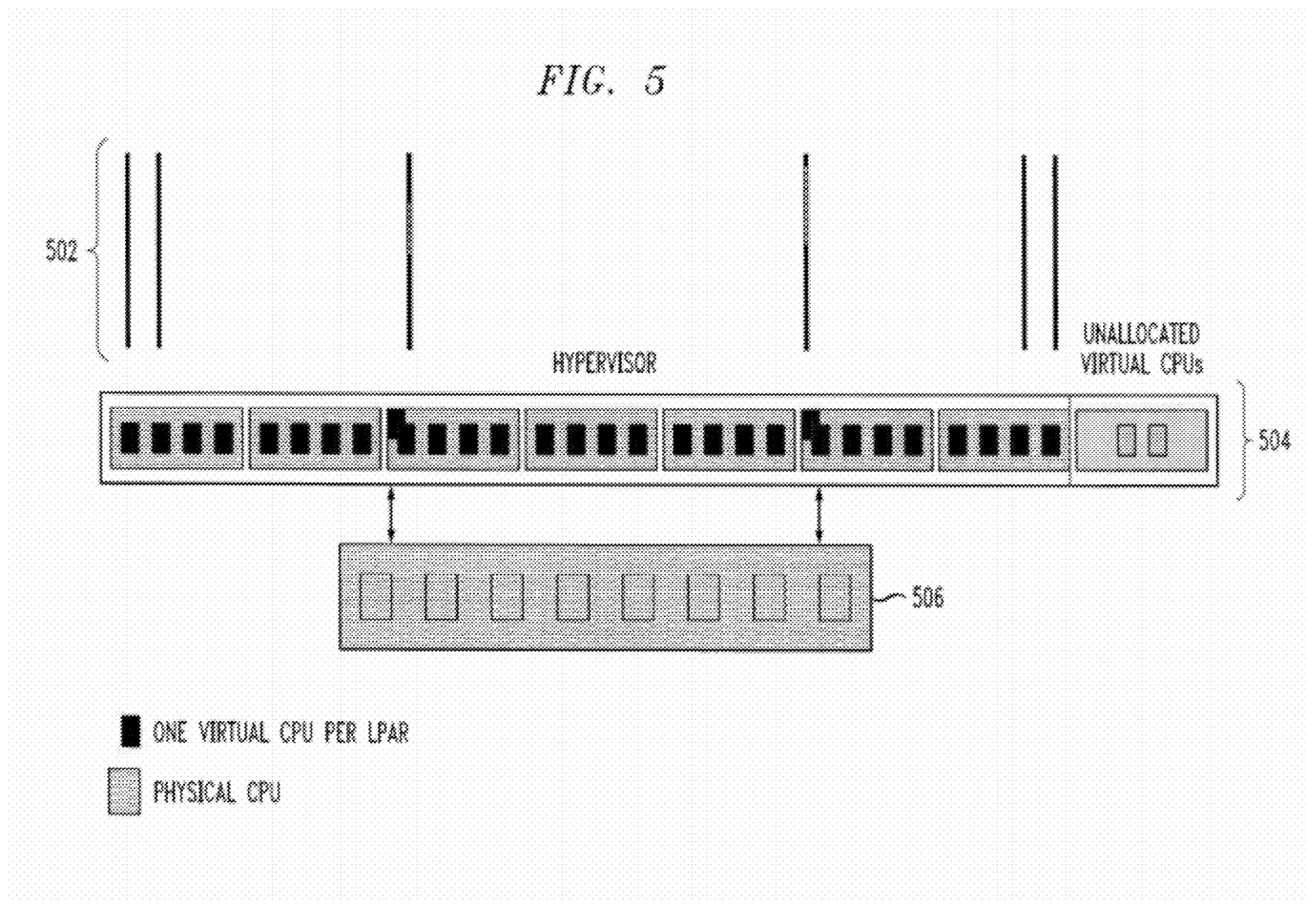
FIG. 5 is a diagram illustrating allocation of additional compute resources from a shared pool of unallocated virtual CPUs to logical partitions (LPARs) running slower threads to compensate for processor cycles lost due to OS jitter, according to an embodiment of the present invention.

The hypervisor can allocate the virtual CPUs that were unassigned in the beginning to the LPARs in proportion to the amount of the work done. Also, the LPAR with the slowest thread can receive the highest share of the additional compute resource. This is shown in FIG. 5, where the two middle threads of the six threads denoted in 502 are shown to be hit by OS jitter and the lost cycles are compensated by allocating one virtual CPU each to both of them from the shared unallocated pool of virtual CPUs. FIG. 5 illustrates allocation of additional compute resources from a shared pool of unallocated virtual CPUs to LPARs running slower threads to compensate for processor cycles lost due to OS jitter, according to an embodiment of the present invention. By way of illustration, FIG. 5 also depicts an eight physical CPU 506 machine being used to create logical partitions (LPARs) and a shared pool of free virtual CPUs 504.

Figure 6:
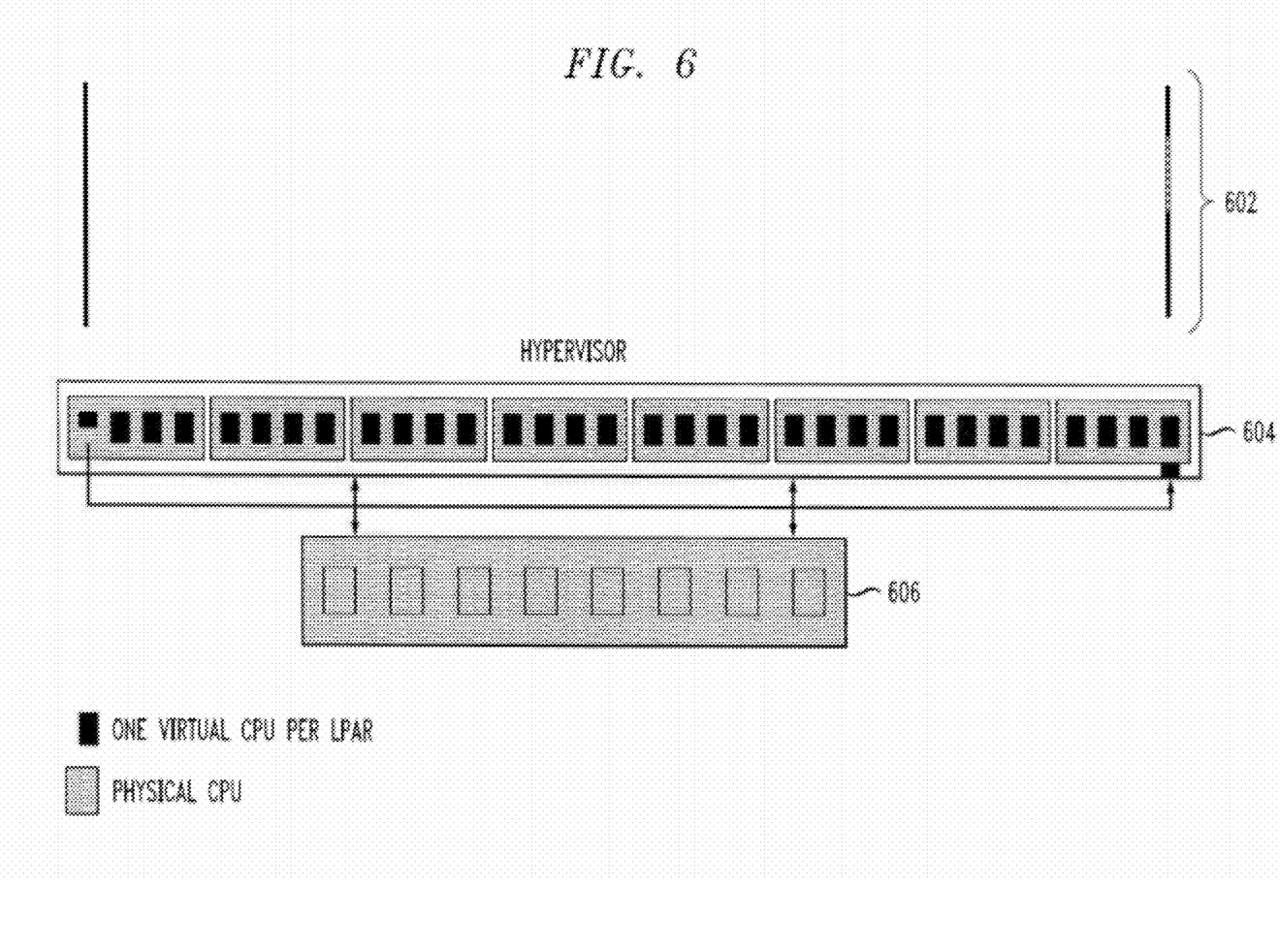
FIG. 6 is a diagram illustrating allocation of additional compute resources from logical partitions running faster threads to logical partitions running slower threads to compensate for processor cycles lost due to OS jitter, according to an embodiment of the present invention.

Also, in one or more embodiments of the invention, no virtual processors are left unallocated at the start. Once the hypervisor has gathered information about how many cycles have been lost due to OS jitter in each LPAR, it can make use of this information, for example, to take away computing resource from logical partitions (LPARs) that run the faster HPC application threads and allocate it to the logical partitions (LPARs) that run the slower HPC application threads in a manner such that all the HPC threads (interrupted and uninterrupted) finish their compute phase at the same time.

This is shown in FIG. 6, where one of the threads 602 is shown to be hit by OS jitter thereby slowing it down. Partition of a virtual CPU from one of the faster threads is taken away and allocated to the slower thread so that both finish at the same time. As such, FIG. 6 is a diagram illustrating allocation of additional compute resources from logical partitions running faster threads to logical partitions running slower threads to compensate for processor cycles lost due to OS jitter, according to an embodiment of the present invention. By way of illustration, FIG. 6 also depicts an eight physical CPU 606 machine being used to create logical partitions (LPARs) and a shared pool of free virtual CPUs 604.

In one or more embodiments of the invention, the steps detailed herein can be repeated each time a jitter process interrupts an application thread in any of the logical partitions, runs for some time and then gets de-scheduled at which time the pool of free compute resources are gathered back and reallocated.

Figure 7:
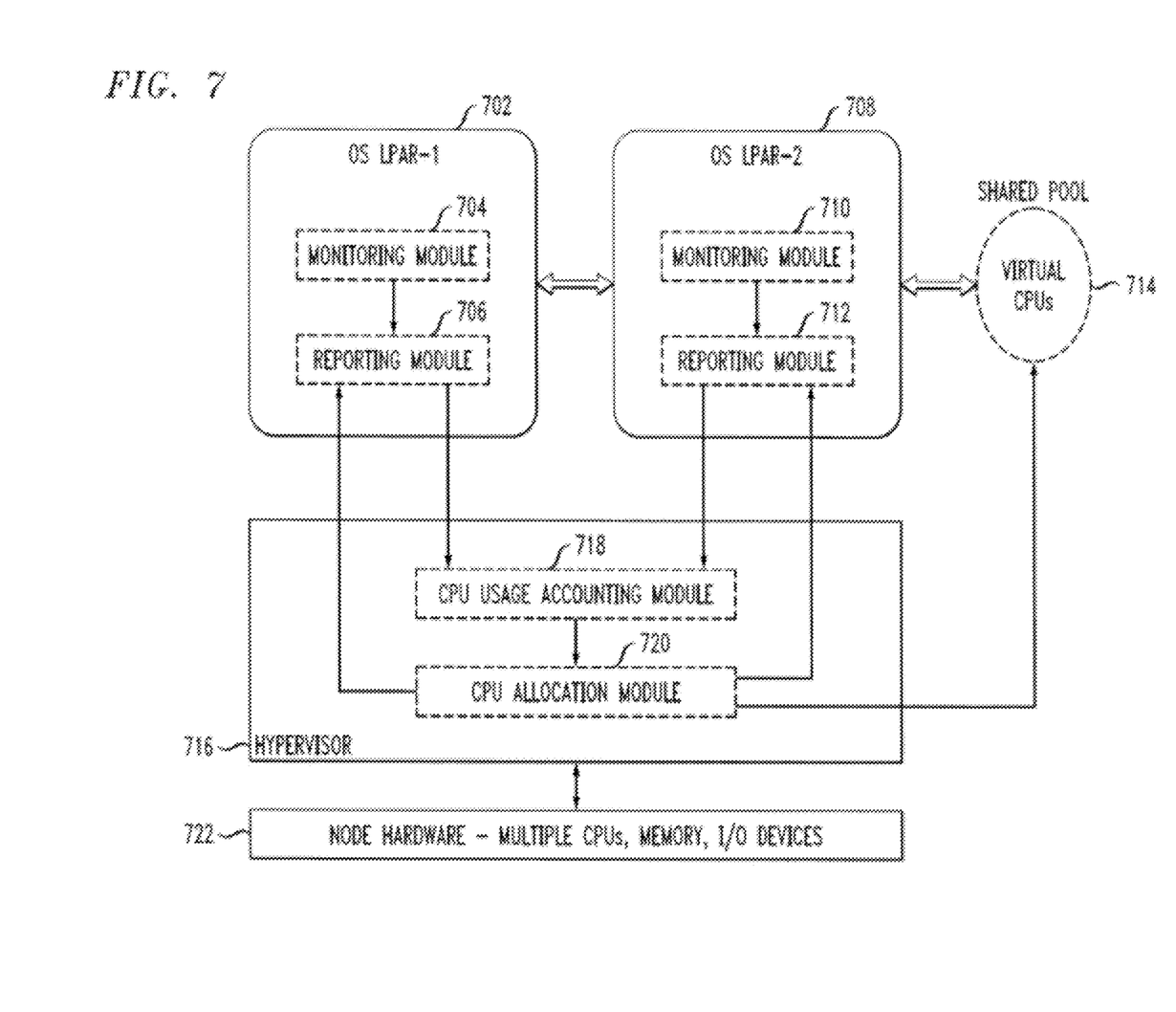
FIG. 7 is a block diagram of a non-limiting exemplary embodiment, according to an aspect of the invention.

FIG. 7 is a block diagram of a non-limiting exemplary embodiment, according to an aspect of the invention. By way of illustration, FIG. 7 depicts monitoring modules 704 and 710 and reporting modules 706 and 712 residing inside operating systems (OS) running on a logical partition (LPAR) 702 and 708 (which can, in turn, execute on top of a hardware processor). The monitoring modules 704 and 710 measure the cycles lost due to OS jitter and notify the reporting modules 706 and 712. The reporting modules 706 and 712 communicate this each time a jitter process gets de-scheduled to a CPU usage accounting module 718. The CPU usage accounting module 718 resides inside a hypervisor layer 716 that runs directly on top of the node hardware 722 and controls its resources (for example, multiple CPUs, memory and I/O devices).

The CPU usage accounting module 718 receives the cycles lost due to OS jitter in various LPARs every time a jitter process get de-scheduled in one of the LPARs. The CPU usage accounting module 718 determines the required additional compute resources from a shared pool of unallocated compute resources or from the logical partitions running the faster threads to one or more logical partitions running the slower threads of the one or more parallel programs in proportion of the one or more cycles consumed by the one or more sources of operating system jitter in each compute phase in each of the one or more logical partitions. This is communicated to a CPU allocation module 720 that allocates one or more additional computing resources from a shared pool of virtual CPUs 714.

Figure 8:
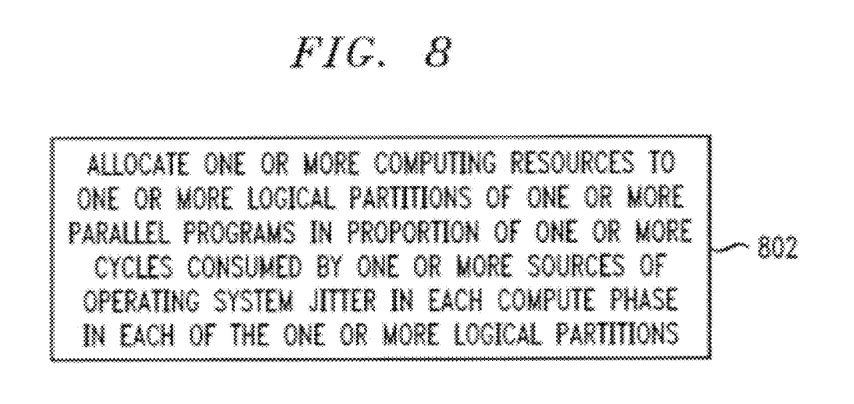
FIG. 8 is a flow diagram illustrating techniques for eradicating operating system jitter-induced slowdown, according to an embodiment of the present invention.

FIG. 8 is a flow diagram illustrating techniques for eradicating operating system jitter-induced slowdown (for example, running in a virtualized environment), according to an embodiment of the present invention. Step 802 includes allocating one or more (additional) computing resources to one or more logical partitions (for example, those running one or more slower threads) of one or more parallel programs in proportion of one or more cycles consumed by one or more sources of operating system jitter in each compute phase in each of the one or more logical partitions. This step can be carried out, for example, using a CPU usage accounting module and a CPU allocation module (for example, components 718 and 720 in FIG. 7). By way of example, in one or more embodiments of the invention, the parallel programs include parallel programs running in a virtualized environment.

Allocating computing resources to logical partitions of one or more parallel programs can include, for example, allocating computing resources from a shared pool of one or more unallocated resources and/or from one or more logical partitions running one or more faster threads. Additionally, allocating computing resources to one or more logical partitions of parallel programs can include introducing one or more hooks in a hypervisor to request additional virtual processors to compensate for time spent in servicing non-program threads. Further, allocating computing resources to logical partitions of parallel programs further can also include taking into account time spent for allocating an additional processor, as well as additionally including accounting for interrupted cycles.

The techniques depicted in FIG. 8 can also include measuring one or more cycles consumed by one or more sources of operating system jitter. This step can be carried out, for example, using a monitoring module (for example, component 704 or 710 in FIG. 7). Measuring cycles consumed by sources of operating system jitter can include monitoring each thread of the parallel programs to record each pre-emption due to one or more other processes until each program reaches a barrier call. Also, one or more embodiments of the invention include recording time spent in servicing each of one or more non-program threads in a compute phase. This step can be carried out, for example, using a monitoring module (for example, component 704 or 710 in FIG. 7). In one or more embodiments of the invention, the monitoring module can reside inside an operating system executing on a logical partition on top of a hypervisor layer.

Further, the techniques depicted in FIG. 8 can include notifying a hypervisor of the cycles consumed by the sources of operating system jitter after a fastest task in each of the one or more parallel programs reaches a pre-defined checkpoint percentage of its compute phase and/or after a jitter process interrupts an application thread, runs for some time and then gets de-scheduled in any of the logical partitions. This step can be carried out, for example, using a reporting module (for example, component 706 or 712 in FIG. 7). In one or more embodiments of the invention, the reporting module can reside inside an operating system executing on a logical partition on top of a hypervisor layer.

One or more embodiments of the invention additionally include leaving one or more virtual processors in a processor pool unallocated. This step can be carried out, for example, using a CPU allocation module (for example, component 720 in FIG. 7). Also, the techniques depicted in FIG. 8 can also include computing overheads of one or more hypercalls and dynamic allocation of compute resources a priori (for example, to choose the checkpoint percentage). This step can be carried out, for example, using a CPU accounting module (for example, component 718 in FIG. 7). One or more embodiments of the invention can also include using hypercalls to exchange application progress statistics and/or cycles lost due to OS jitter in each logical partition (LPAR) with the hypervisor. This step can be carried out, for example, using a reporting module (for example, component 706 or 712 in FIG. 7).

Additionally, the techniques depicted in FIG. 8 can include calculating the one or more (additional) computing resources to be allocated to the one or more logical partitions of the one or more parallel programs in proportion of the one or more cycles consumed by the one or more sources of operating system jitter in each compute phase in each of the one or more logical partitions. This step can be carried out, for example, using a CPU accounting module (for example, component 718 in FIG. 7).

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 9:
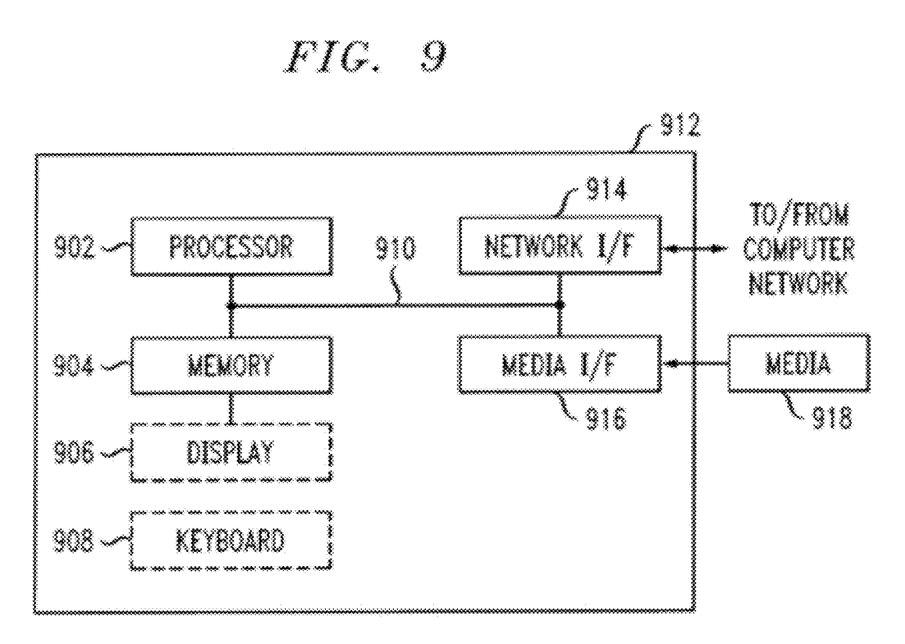
FIG. 9 is a system diagram of an exemplary computer system on which at least one embodiment of the present invention can be implemented.

One or more embodiments can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer).

The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 918) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 904), magnetic tape, a removable computer diskette (for example media 918), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 902 coupled directly or indirectly to memory elements 904 through a system bus 910. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package or entirely on a remote computer or server.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 7. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, logical partitions requesting additional computing resource either from a shared pool of free CPUs or from the logical partitions running the faster threads to speed up the thread execution so that it finishes simultaneously with the uninterrupted threads.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for eradicating operating system jitter-induced slowdown, the method comprising:
    measuring one or more cycles consumed by one or more sources of operating system jitter in each compute phase in each of one or more logical partitions of multiple parallel programs;
    notifying a hypervisor of the one or more cycles consumed by the one or more sources of operating system jitter after a fastest task in each of the parallel programs reaches a pre-defined checkpoint percentage of its compute phase; and
    dynamically allocating, via the hypervisor, one or more computing resources to one or more logical partitions running a task executing slower than the fastest task in each of the multiple parallel programs in proportion of the one or more cycles consumed by the one or more sources of operating system jitter in each compute phase in each of the one or more logical partitions such that each slower task finishes the compute phase at the same time as the fastest task in each of the parallel programs.

2. The method of claim 1, further comprising:
    providing a system, wherein the system comprises distinct software modules, each of the distinct software modules being embodied on a tangible computer-readable recordable storage medium, and wherein the distinct software modules comprise a central processing unit (CPU) allocation module;
    wherein:
    the step of allocating one or more computing resources to one or more logical partitions of one or more parallel programs in proportion of one or more cycles consumed by one or more sources of operating system jitter in each compute phase in each of the one or more logical partitions is carried out by the CPU allocation module executing on the hardware processor.

3. The method of claim 2, wherein:
    the distinct software modules further comprise a monitoring module, and
    wherein:
    measuring one or more cycles consumed by one or more sources of operating system jitter is carried out by the monitoring module residing inside an operating system executing on a logical partition on top of a hypervisor layer.

4. The method of claim 3, wherein:
    the step of measuring one or more cycles consumed by one or more sources of operating system jitter comprises the monitoring module, residing inside an operating system executing on a logical partition on top of a hypervisor layer, monitoring each thread of the one or more parallel programs to record each pre-emption due to one or more other processes until each program reaches a barrier call.

5. The method of claim 3, wherein:
    the distinct software modules comprise a monitoring module, and wherein:
    recording time spent in servicing each of one or more non-program threads in a compute phase is carried out by the monitoring module residing inside an operating system executing on a logical partition on top of a hypervisor layer.

6. The method of claim 2, wherein:
    the distinct software modules further comprise a reporting module, and wherein:
    notifying a hypervisor of the one or more cycles consumed by the one or more sources of operating system jitter after a fastest task in each of the one or more parallel programs reaches a pre-defined checkpoint percentage of its compute phase is carried out by the reporting module residing inside an operating system executing on a logical partition on top of a hypervisor layer.

7. The method of claim 2, wherein:
    the step of allocating one or more computing resources to one or more logical partitions of one or more parallel programs comprises the CPU allocation module, executing on the hardware processor, allocating one or more computing resources from a shared pool of one or more unallocated resources.

8. The method of claim 2, wherein:
    the step of allocating one or more computing resources to one or more logical partitions of one or more parallel programs comprises the CPU allocation module, executing on the hardware processor, allocating one or more computing resources from one or more logical partitions running one or more faster threads.

9. The method of claim 2, wherein:
    the distinct software modules comprise a CPU allocation module, and wherein:
    leaving one or more virtual processors in a processor pool unallocated is carried out by the CPU allocation module executing on a hardware processor.

10. The method of claim 2, wherein:
    the distinct software modules further comprise a CPU usage accounting module, and wherein:
    computing one or more overheads of one or more hypercalls and dynamic allocation of one or more compute resources a priori is carried out by the CPU usage accounting module executing on a hardware processor.

11. The method of claim 2, wherein:
    the step of allocating one or more computing resources to one or more logical partitions of one or more parallel programs comprises the CPU usage accounting module, executing on the hardware processor, introducing one or more hooks in a hypervisor to request one or more additional virtual processors to compensate for time spent in servicing one or more non-program threads.

12. The method of claim 2, wherein:
    the step of allocating one or more computing resources to one or more logical partitions of one or more parallel programs further comprises the CPU usage accounting module, executing on the hardware processor, taking into account time spent for allocating an additional processor.

13. The method of claim 2, wherein:
    the step of allocating one or more computing resources to one or more logical partitions of one or more parallel programs further comprises the monitoring module, residing inside an operating system executing on a logical partition on top of a hypervisor layer, accounting for one or more interrupted cycles.

14. The method of claim 2, wherein:
    the distinct software modules comprise a reporting module, and wherein:
    using one or more hypercalls to exchange application progress statistics is carried out by the reporting module residing inside an operating system executing on a logical partition on top of a hypervisor layer.

15. The method of claim 1, wherein the one or more parallel programs comprise one or more parallel programs running in a virtualized environment.

16. The method of claim 2, wherein:
    the distinct software modules comprise a CPU accounting module, and wherein:

calculating the one or more computing resources to be allocated to the one or more logical partitions of the one or more parallel programs in proportion of the one or more cycles consumed by the one or more sources of operating system jitter in each compute phase in each of the one or more logical partitions is carried out by the CPU accounting module executing on a hardware processor.

17. A computer program product comprising a tangible computer readable recordable storage medium including computer useable program code for eradicating operating system jitter-induced slowdown, the computer program product including:

computer useable program code for measuring one or more cycles consumed by one or more sources of operating system jitter in each compute phase in each of one or more logical partitions of multiple parallel programs;

computer useable program code for notifying a hypervisor of the one or more cycles consumed by the one or more sources of operating system jitter after a fastest task in each of the parallel programs reaches a pre-defined checkpoint percentage of its compute phase; and computer useable program code for dynamically allocating, via the hypervisor, one or more computing resources to one or more logical partitions running a task executing slower than the fastest task in each of the multiple parallel programs in proportion of the one or more cycles consumed by the one or more sources of operating system jitter in each compute phase in each of the one or more logical partitions such that each slower task finishes the compute phase at the same time as the fastest task in each of the parallel programs.

18. The computer program product of claim 17, wherein the computer usable program code for eradicating operating system jitter-induced slowdown comprises distinct software modules, the distinct software modules comprising a central processing unit (CPU) allocation module;

wherein:

the CPU allocation module comprises the computer usable program code for allocating one or more computing resources to one or more logical partitions of one or more parallel programs in proportion of one or more cycles consumed by one or more sources of operating system jitter in each compute phase in each of the one or more logical partitions.

19. A system for eradicating operating system jitter-induced slowdown, comprising:

a memory; and at least one processor coupled to the memory and operative to:

measure one or more cycles consumed by one or more sources of operating system jitter in each compute phase in each of one or more logical partitions of multiple parallel programs;

notify a hypervisor of the one or more cycles consumed by the one or more sources of operating system jitter after a fastest task in each of the parallel programs reaches a pre-defined checkpoint percentage of its compute phase; and dynamically allocate, via the hypervisor, one or more computing resources to one or more logical partitions running a task executing slower than the fastest task in each of the multiple parallel programs in proportion of the one or more cycles consumed by the one or more sources of operating system jitter in each compute phase in each of the one or more logical partitions such that each slower task finishes the compute phase at the same time as the fastest task in each of the parallel programs.

20. The system of claim 19, further comprising a tangible computer-readable recordable storage medium having distinct software modules embodied thereon, the distinct software modules comprising a CPU allocation module;

wherein:

the step of allocating one or more computing resources to one or more logical partitions of one or more parallel programs in proportion of one or more cycles consumed by one or more sources of operating system jitter in each compute phase in each of the one or more logical partitions is carried out by the CPU allocation module executing on the at least one processor.

* * * * *